(12) United States Patent
Ogiue et al.

(10) Patent No.: US 7,246,476 B2
(45) Date of Patent: Jul. 24, 2007

(54) METHOD FOR HIGH-SPEED VACUUM UNITARY PACKAGING OF PORTION-CUT MEATS

(75) Inventors: Haruo Ogiue, Kunitachi (JP); Toshio Hanai, Tokyo (JP)

(73) Assignee: Best Pack Co., Ltd., Tokyo (JP)

( * ) Notice: Subject to any disclaimer, the term of this patent is extended or adjusted under 35 U.S.C. 154(b) by 0 days.

(21) Appl. No.: 11/214,733

(22) Filed: Aug. 31, 2005

(65) Prior Publication Data

US 2006/0045941 A1    Mar. 2, 2006

(30) Foreign Application Priority Data

Aug. 31, 2004    (JP)  .............................. 2004-251373

(51) Int. Cl.
- *B65B 7/06* (2006.01)
- *B65B 31/02* (2006.01)
- *B65B 51/10* (2006.01)
- *B65B 53/02* (2006.01)

(52) U.S. Cl. ............................ 53/433; 53/442; 53/450; 53/479; 53/375.6

(58) Field of Classification Search ............... 53/375.6, 53/374.6

See application file for complete search history.

(56) References Cited

U.S. PATENT DOCUMENTS

| | | | | |
|---|---|---|---|---|
| 2,232,783 A | * | 2/1941 | Hausheer | ..................... 53/450 |
| 3,289,386 A | * | 12/1966 | Farmer | ......................... 53/415 |
| 4,735,675 A | * | 4/1988 | Metz | ....................... 156/583.4 |
| 5,666,788 A | * | 9/1997 | Tolson | .......................... 53/442 |
| 5,715,645 A | * | 2/1998 | Fukuda | ........................... 53/75 |
| 2002/0083683 A1 | * | 7/2002 | Suga | ........................... 53/432 |

* cited by examiner

*Primary Examiner*—John Sipos
(74) *Attorney, Agent, or Firm*—Wenderoth, Lind & Ponack, L.L.P.

(57) ABSTRACT

Disclosed is a method for high-speed vacuum unitary packaging of portion-cut meats, wherein a vacuum four-side sealed object containing a plurality of portion-cut meats obtained by dividing a livestock meat, such as beef, pork, chicken, or the like, or a large-size fish into many portions, is divided into four-side sealed objects with vacuum being maintained at high speed using an impulse sealer for vacuum unitary packaging. At least two portion-cut meats are loaded on a conveyor with a prescribed spacing being given between portion-cut meats; a vacuum four-side sealed object is formed by using upper and lower wrapping films having gas-barrier properties and inner surface thermal fusion bonding properties to integrally vacuum package the portion-cut meats; a flat part between portion-cut meats in the vacuum four-side sealed object is fusion bonded by using a heat impulse sealer for heating film layers from both above and below to form at least two seal lines; and the films between the at least two seal lines are secondary cut, with a second energization of lower heater wires and secondary cutting being simultaneously performed after a first energization of upper heater wires has been completed, or with a second energization of upper heater wires and secondary cutting being simultaneously performed after a first energization of lower heater wires has been completed.

20 Claims, 4 Drawing Sheets

METHOD FOR HIGH-SPEED VACUUM UNITARY PACKAGING OF PORTION-CUT MEATS

FIELD OF THE INVENTION

The present invention relates to a method for high-speed vacuum unitary packaging of portion-cut meats, wherein a vacuum four-side sealed object containing a plurality of portion-cut meats obtained by dividing a livestock meat, such as beef, pork, chicken, or the like, or a large-size fish, into many portions is divided into four-side sealed objects with vacuum being maintained at high speed using an impulse sealer for vacuum unitary packaging.

BACKGROUND OF THE INVENTION

Conventionally, a dressed carcass of one head of cattle has been divided into twenty-six portions, such as loin, short plate, fillet, and the like, and these twenty-six portion-cut meats have been vacuum packaged, cooled after a film having been shrunk by heating or without the film being shrunk, and then stored and delivered at around 0 deg C. to be supplied as so-called chilled beef.

In order to further divide these portion-cut meats and supply them to end consumers, skilled technicians have been required. Recently, supermarkets and the like have had a demand for portion-cut meats, such as beef, pork, large-size fishes, chicken, and the like, which have been divided into smaller parts such that even unskilled people can process them.

In patent literature 1, the present inventor et al. disclosed a method, wherein a rolled lower film, which has gas-barrier properties and thermal fusion bonding properties, is unrolled; at least two portion-cut meats are loaded on the lower film with a spacing being given between portion-cut meats and a front end of the lower film having been fusion bonded to a front end of an upper film; rolled upper film is unrolled to cover the portion-cut meats on the lower film, and the upper and lower films are fusion bonded to each other; at a middle of a fusion bonded area, the films are cut to obtain a tubular sealed object holding portion-cut meats between the upper and lower films; this tubular sealed object is evacuated from both openings thereof; the openings are sealed for vacuum sealing to obtain a vacuum four-side sealed object containing at least two portion-cut meats; then, in a flat part between portion-cut meats contained in this vacuum packaged object, at least two seal lines are produced by using an impulse sealer, with which timings for starting heating of upper and lower heater wires differ by 0.3 to 4 sec, and then between the seal lines the films are secondary-cut.

As films for packaging of these portion-cut meats, various films, such as those as disclosed in patent literature 2 and patent literature 3, are available.

In recent years, an increasing number of mass merchandisers who want to simplify their tray packaging work, and consumers have requested that, for beef, for example, one head of cattle be divided into seventy-four portions or one hundred-eighty portions, and these be delivered, being individually vacuum packaged as separate products.

Patent literature 1: Japanese Laid-Open Publication No. 2004-161291

Patent literature 2: Japanese Laid-Open Publication No. 10-34800/1998

Patent literature 3: Japanese Laid-Open Publication No. 11-207886/1999

As a result of performing the art of the patent literature 1, for example, when smaller portion-cut meats of a pig were vacuum unitary packaged using upper and lower films having a width of 850 mm, a dividing step by using the impulse sealer took approximately 7 sec on average. Because placing a plurality of portion-cut meats in one packaging container for vacuum packaging them has been improved for a higher speed, a dividing time period of approximately 7 sec is becoming an obstacle in improvement of work efficiency. A cause for the dividing time period having been as long as approximately 7 sec was that, unless a cooling time, even if momentary, were provided after energizing and heating one of the upper and lower heater wires and before energizing the other, it would be difficult to reliably fusion bond the films, one of which has a thickness two or three times larger or smaller than that of the other.

If a period of time for energization of the upper and lower heater wires is shortened, there arises a problem in that a seal strength of a sealed part is reduced, and thus vacuum leakage may occur at a stage of distribution. On the other hand, if a sufficient period of time for cooling is not provided, there occurs a problem in that a seal line area is stretched during cutting and a vacuum leak may be produced at a seal line, resulting in damage being caused to form as a commercial product.

In addition, because of a demand for cost reduction, there is a trend for thinner films being used. With thin films, tolerances for the period of time for energization and a difference in timing for starting energization of the upper and lower heaters have been narrowed in order to provide reliable sealing by the impulse sealer while eliminating a possibility of seal breakage, and it is becoming difficult to adjust a timing of activating functions of the impulse sealer.

SUMMARY OF THE INVENTION

The present invention has been devised in view of the above-mentioned problems, and is configured to provide a method for high-speed vacuum unitary packaging of portion-cut meats, wherein at least two portion-cut meats are loaded on a conveyor with a prescribed spacing being given between portion-cut meats; a vacuum four-side sealed object is formed by using upper and lower wrapping films having gas-barrier properties and inner surface thermal fusion bonding properties to integrally vacuum package the portion-cut meats; a flat part between portion-cut meats in the vacuum four-side sealed object is fusion bonded by using a heat impulse sealer for heating film layers from both above and below to form at least two seal lines; and the films between the at least two seal lines are secondary cut; with a second energization of lower heater wires and secondary cutting being simultaneously performed after a first energization of upper heater wires is completed, or with a second energization of upper heater wires and secondary cutting being simultaneously performed after a first energization of lower heater wires is completed. A thermal fusion bonding layer of the film has gas-barrier properties and inner surface thermal fusion bonding properties including self-welding properties, and a melting peak temperature of the thermal fusion bonding layer is 60 to 110 deg C.

In other words, the present inventor et al. have found that, for example, by first energization of the upper (or lower) heater wires for a slightly short time period of approximately at most 1 sec, a temporary fusion bonding is achieved, with the fusion bonding achieved being such that no vacuum leakage will occur when the films are left as they are, and a film temperature is relatively low. Therefore, heater units are cooled for as short as approximately 0.3 sec, with the films having been temporarily fusion bonded, and then second energization of the lower (or upper) heater wires and cutting can be simultaneously performed. As a result of this, a need for providing a period of time for cutting, which has conventionally required approximately 1 sec, can be eliminated. After the second energization of the lower (or upper) heater wires has been sufficiently performed, a film temperature is raised, and it has conventionally taken 2 sec to cool this raised temperature down to a temperature at which cutting can be performed; however, with the present invention, only a shorter time period of 1.5 sec is required for cooling before unloading vacuum unitary packaged objects from the impulse sealer. As a result of this, a period of time for division by the impulse sealer, which had conventionally been 7 sec, has been reduced to 5.5 sec.

The present invention presupposes the art of loading two or three small-sized portion-cut meats with a spacing being given therebetween, and evacuating a container for collectively vacuum sealing these meats, in order to save time and quantity of film required for evacuation, and suppress exudation of drips.

In dividing a vacuum sealed packaged object containing a plurality of portion-cut meats, occurrence of wrinkles in areas to be sealed is inevitable. Therefore, it had been difficult to uniformly heat-seal a vacuum sealed packaged object over an entirety thereof; however, time required for a step for dividing with an impulse sealer has been reduced by performing first energization of one of the upper and lower heater wires in the impulse sealer. Then, after a momentary period of time for heater unit cooling, simultaneously performed is cutting and second energization of the other of the upper and lower heater wires. And then, allowing the heater unit to cool for approximately 1.5 sec before removing vacuum unitary packaged objects.

As a portion-cut meat is divided into smaller portions, it tends to exude a large amount of drips. According to the present invention, with which special films are used and passed through a hot blast tunnel, it is possible to load a plurality of smaller portion-cut meats with a spacing being given therebetween, and collectively vacuum package these meats. According to the present invention, with which, in dividing a vacuum packaged object into unitary packaged objects, first energization of one of upper and lower heater wires is performed, which is then followed by cooling for a very short time, and then second energization of the other of the upper and lower heater wires and secondary cutting are simultaneously performed, a period of time required for unitary packaging an entirety of portion-cut meats can be remarkably reduced.

DETAILED DESCRIPTION OF THE PREFERRED EMBODIMENTS

Figure 1:
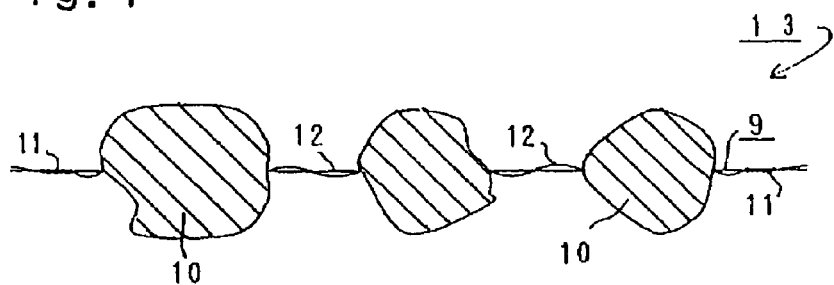
FIG. 1 is a cross-sectional view of a vacuum packaged object containing at least two portion-cut meats arranged in one line with a certain spacing being given between these portion-cut meats.

The present invention is applicable not only to beef, but also to other livestock meats, such as pork, chicken, and the like, and fish meats.

It is preferable that a film to be used in the present invention have inner surface thermal fusion-bonding properties, gas-barrier properties, and self-welding properties. Herein, the term "self-welding properties" refers to properties by which, when a packaged object is heated by passing it through a hot blast tunnel, or the like, thermal fusion bonding layers of upper and lower films are weakly fusion bonded to each other, which results in exudation of a drip from a portion-cut meat being made difficult, and a drip, if exuded, being prevented from spreading over a flat part. A hot blast tunnel is an apparatus through which each particular vacuum packaged object is passed for 2 to 10 sec, and preferably for 3 to 7 sec, for exposure to a hot blast at 60 to 110 deg C., and preferably at 70 to 95 deg C. By this operation, the upper and lower films are lightly fusion bonded to each other over the flat part in its entirety, where no portion-cut meat exists; thus, a drip is prevented from passing therethrough. Unlike upper and lower films in a normal fusion bonded part, those in a self-welded portion are fusion bonded to such a degree that they can be easily peeled from each other if pulled in opposite directions.

Film to be used in the present invention is required to have thermal fusion bonding properties and self-welding properties. In order to meet such requirements for characteristics, a melting peak temperature of a synthetic resin which mainly constitutes a thermal fusion bonding layer, which is an innermost layer, is required to be in a range of 60 to 110 deg C., and preferably in a range of 70 to 95 deg C., as measured in compliance with JIS K 7125. For example, some of soft polyolefin resins, such as ethylene-vinyl acetate copolymer, linear low density polyethylene, ethylene-methyl methacrylate copolymer, ethylene-methacrylic acid copolymer, metallocene, and the like, can satisfy this requirement. Among these, the ethylene-vinyl acetate copolymer whose content of vinyl acetate is 15 to 25% by weight is preferably used. The wording of "the synthetic resin which mainly constitutes the thermal fusion bonding layer" refers to a synthetic resin which accounts for at least 60% by weight, and preferably for at least 80% by weight, of a thermal fusion bonding layer.

In the present invention, either a heat-shrinkable or non-heat-shrinkable film can be used. Generally, films tend to shrink more or less when they are exposed to a high temperature. If a shrinkage percentage at a high temperature is around 5%, it is possible to seal and secondary-cut a vacuum packaged four-side sealed object, using an impulse sealer, after passing it through a hot blast tunnel. However, if a highly heat-shrinkable film is used, there is a possibility that a prescribed spacing for secondary cutting which is previously provided between at least two portion-cut meats also shrinks, which makes it difficult to perform secondary cutting. Therefore, for using a highly shrinkable film, secondary cutting of a four-side sealed object by use of an impulse sealer is performed before passing it through a hot blast tunnel.

FIG. 1 is a cross-sectional view of a four-side sealed object 13 containing three portion-cut meats arranged in one line with a prescribed spacing between the portion-cut meats. A method for manufacturing the four-side sealed object 13 will be later described. Numeral 9 indicates upper and lower films, and numeral 11 indicates a fusion bonded part. A flat part 12 provides a prescribed spacing by which adjacent portion-cut meats 10 can be separated from each other using an impulse sealer. Because a shape and size of the portion-cut meats 10 packaged are irregular, it is inevitable that wrinkles are produced in the films in the flat part 12 between the portion-cut meats. When an impulse sealer as illustrated in FIG. 2 is used for performing heating and pressing in order to cut off the portion-cut meats from each other, it is difficult to heat an area of at least six films overlapped to produce wrinkles for performing satisfactory fusion bonding without causing any seal breakage, as in an area of two films.

Figure 2A:
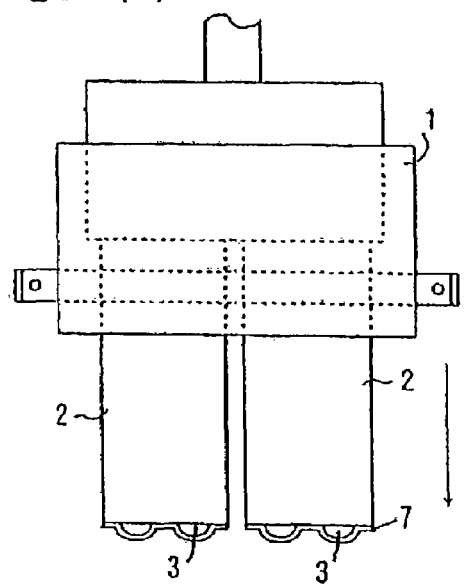
FIG. 2(A) and FIG. 2(B) are explanatory vertical cross-sectional views of a sealer part of an impulse sealer, with FIG. 2(A) illustrating a state in which upper heater units are lifted, and FIG. 2(B) a state in which the upper heater units are lowered.
Figure 2B:
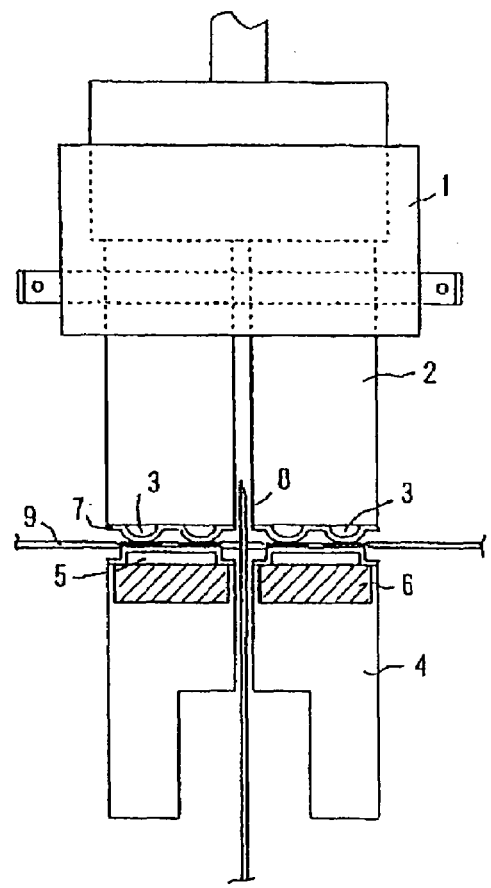

FIG. 2(A) and FIG. 2(B) are vertical cross-sectional views of a sealer part of an impulse sealer to be used in the present invention, with FIG. 2(A) illustrating a state in which upper heater units are lifted, and FIG. 2(B) a state in which the upper heater units are lowered. Numeral 1 indicates a mounting guide, and two upper heater units 2 are mounted to the mounting guide 1 in parallel. At lower ends of the upper heater units, two upper heater wires 3 are attached substantially over an entire length of the upper heater units, respectively. At upper ends of lower heater units 4, lower heater wires 5 are attached at locations which correspond to the upper heater wires 3. Under the lower heater wires 5, a heat-resistant cushioning member 6 made of silicone rubber or the like is loaded, respectively. Surfaces of the upper heater wires 3 and the lower heater wires 5 are coated with a peelable tape 7 made of a fluororesin, such as Teflon (trade name) or the like, or a silicone resin such that films will not adhere to the heater wires due to heat. Numeral 8 indicates a cutting blade, which waits, being faced upward, between the two lower heater units 4, and when the upper heater units 2 have been lowered, is raised to secondary-cut films 9.

On the lower heater wires 5 of the impulse sealer as shown in FIGS. 2(A) and 2(B), the flat part 12 of the four-side sealed object 13 containing at least two portion-cut meats is placed, and a position of the flat part 12 is adjusted such that a middle thereof is positioned directly above a midpoint between the lower heater wires 5, i.e., above the cutting blade 8. The upper heater units 2 are lowered for pressing the flat part 12, a voltage is applied to the upper heater wires 3 for heating, and a heating and pressing state is maintained for 0.5 to 4.0 sec, and preferably for 0.5 to 1.5 sec. This time period varies depending on a type of the films, and is such that a vacuum can barely be maintained, if they are left as they are, without a position of the films relative to each other being changed. With the pressing state being maintained, energization of the upper heater wires 3 is stopped, and the upper heater units 2 are cooled for 0.05 to 1.0 sec, and preferably for 0.1 to 0.5 sec. Then, the cutting blade 8 waiting between the two lower heater units 4 is raised, and the lower heater wires 5 are energized.

Heating by the upper heater wires 3 alone provides a temporary fusion bonding, and a temperature of the films 9 has not been raised much. In addition, because cooling has been performed, even though for a very short period of time, the secondary cutting of the flat part 12 of the films 9, which is provided between the two upper heater units 2 or the lower heater units 4, will not stretch sealed parts. At the same time as cutting starts, energization of the lower heater wires 5 is started. An energization time period is 0.5 to 4.0 sec, and preferably 0.6 to 2.0 sec, which provides a seal strength sufficient to maintain a vacuum around portion-cut meat 10 even if a vacuum unitary packaged object provided by the secondary cutting is subjected to a shock during distribution or storage. Then, by cooling these vacuum unitary packaged objects to such a degree that they can be removed from the heater units, vacuum unitary packaged objects of the present invention can be obtained. In this case, a voltage may be first applied to the lower heater wires 5, and then to the upper heater wires 3.

Because a portion which will be a cut end of a vacuum unitary packaged object to be obtained has been temporarily sealed by use of the upper or lower heater wires immediately before being cut, there is no possibility that vacuum leakage may be caused during cutting. Because heat-sealing is sufficiently performed by the lower or upper heater wires thereafter, a vacuum unitary packaged object which can withstand handling during distribution and storage is obtained. Because a temperature at which sealed films 9 can be removed from the heater units is higher than a temperature at which the films can be cut without being stretched, a period of time required for cooling the films after sealing can be shortened, and at the same time a need for providing a certain period of time for cutting is eliminated.

In FIGS. 2(A) and 2(B), two heater wires (3, 5) were provided for one heater unit (2, 4), however, one or at least three heater wires may be provided for one heater unit. In addition, the cutting blade 8 is raised from a lower position to an upper position, however, it may be lowered from an upper position to a lower position for cutting.

Figure 3:
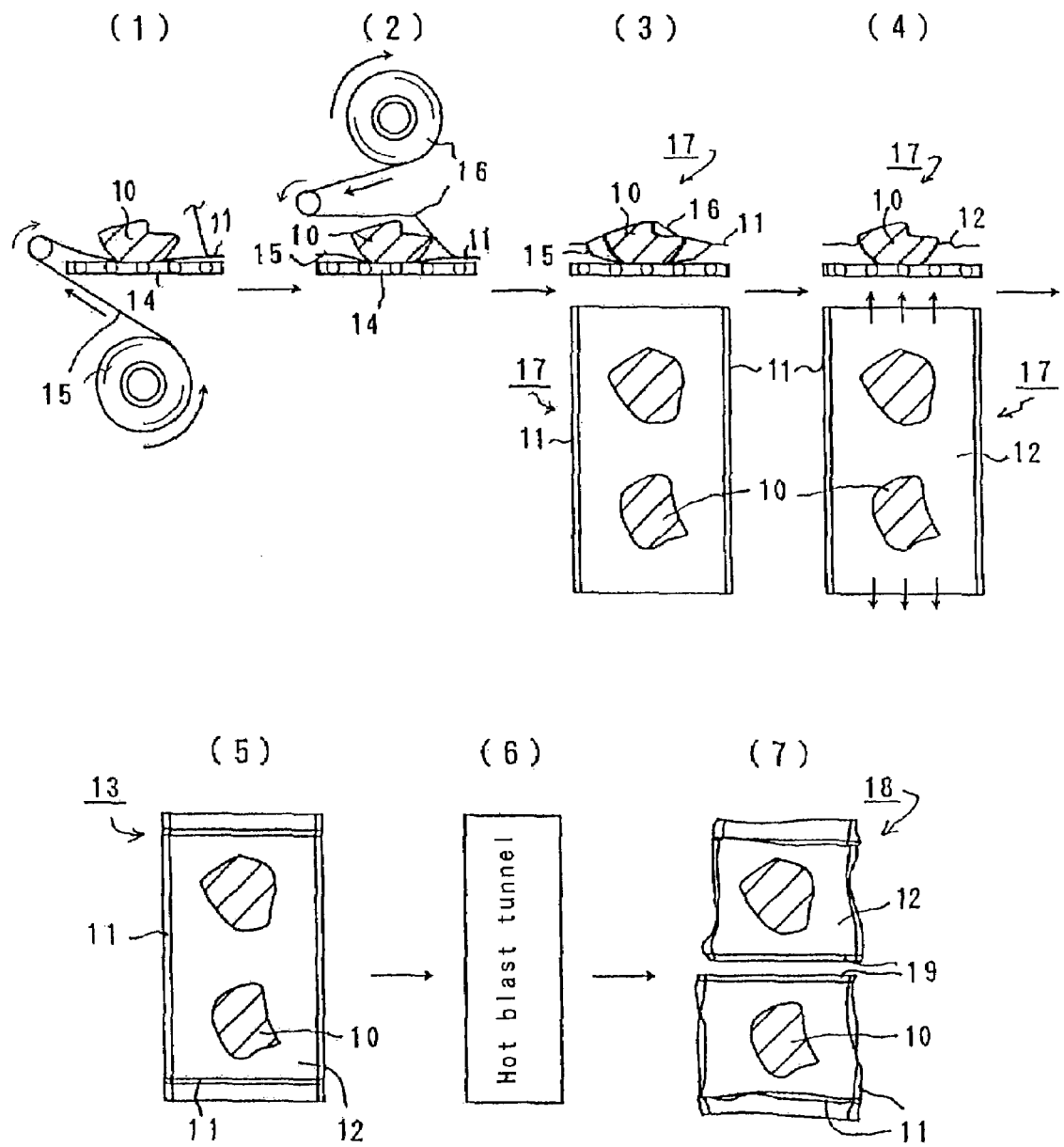
FIG. 3 is a flow sheet illustrating exemplary sequential steps which are performed in a first embodiment of a vacuum unitary packaging method of the present invention.

In a first embodiment of the vacuum unitary packaging method of the present invention, following steps (1) to (7) are sequentially performed as illustrated in FIG. 3.

At step (1), in a portion-cut meat loading area of a rotor conveyor 14 of a packaging machine, portion-cut meats 10 are loaded on a lower film 15 which has been unrolled, with a thermal fusion bonding layer being faced upward. At step (1), a front end of unrolled lower film 15 has been fusion bonded to a front end of an upper film 16 and cut, forming a fusion bonded part 11.

Using beef as an example for explanation, any one of large-sized portion-cut meats obtained by dividing meat of one head of cattle into twenty-six portions can be loaded. However, if a pitch length of the film to be fed is set at a certain value, any at least two of portion-cut meats obtained by dividing into seventy-four portions or one hundred thirty-eight portions can be loaded in a direction perpendicular to that of flow of the films as shown in FIG. 3 (3). In this case, it is important to load the at least two portion-cut meats 10 with a spacing being given therebetween. The spacing therebetween varies depending on sizes of the portion-cut meats; however, the spacing must be sufficient such that secondary cutting by use of the impulse sealer can be performed without any problem.

At step (2), the portion-cut meats 10, which are loaded on the lower film 15 whose front end is previously fusion bonded to the front end of the upper film 16, are covered with the upper film 16 which is unrolled.

At step (3), in an area where no portion-cut meat 10 exists, the films are fusion bonded to each other in a direction perpendicular to that of flow of the films at a certain pitch length, and at a middle of this fusion bonded area, the films are cut to obtain a tubular sealed object 17, and upper and lower films whose front ends have been fusion bonded to each other are cut off from the tubular sealed object 17. The upper and lower films whose front ends have been fusion bonded to each other and which have been cut off from the tubular sealed object 17 will be used when the same step (1) is performed at a subsequent loading time.

At step (4), the tubular sealed object 17 is covered with a vacuum box, and is evacuated for 4 to 15 sec, and preferably for 5 to 10 sec for evacuation of the tubular sealed object 17. Numeral 12 indicates a flat part where the upper and lower films are in direct contact. Subsequent steps are illustrated only with plan views.

At step (5), the films at openings of the evacuated tubular sealed object 17 are transversely fusion bonded to each other. As can be seen from FIG. 1, the flat part 12 also exists between portion-cut meats 10, providing a sufficient spacing for performing secondary cutting.

At step (6), one four-side sealed object 13, which packages at least two portion-cut meats with a spacing being given therebetween, is passed through a hot blast tunnel. By passing this sealed object through the hot blast tunnel, the upper and lower films self-weld to each other in the flat part 12 for prevention of distribution of exuding drips.

At step (7), in an area between the portion-cut meats, the films are sealed and secondary-cut by the method of the present invention. As a result of this, in a suction evacuation step of (4), which is time-consuming, the at least two portion-cut meats can be processed at one time, resulting in work efficiency being improved. Numeral 19 indicates a secondary-cut portion. If one portion-cut meat is loaded at step (1), there is no need for performing step (7) because, at step (5), this portion-cut meat is unitary packaged.

If the films are films having a high heat shrinkage percentage, the flat part 12 also shrinks at step (6), and the secondary cutting at step (7) tends to be difficult. In that case, step (7) may be first performed, and then step (6) may be performed.

Figure 4:
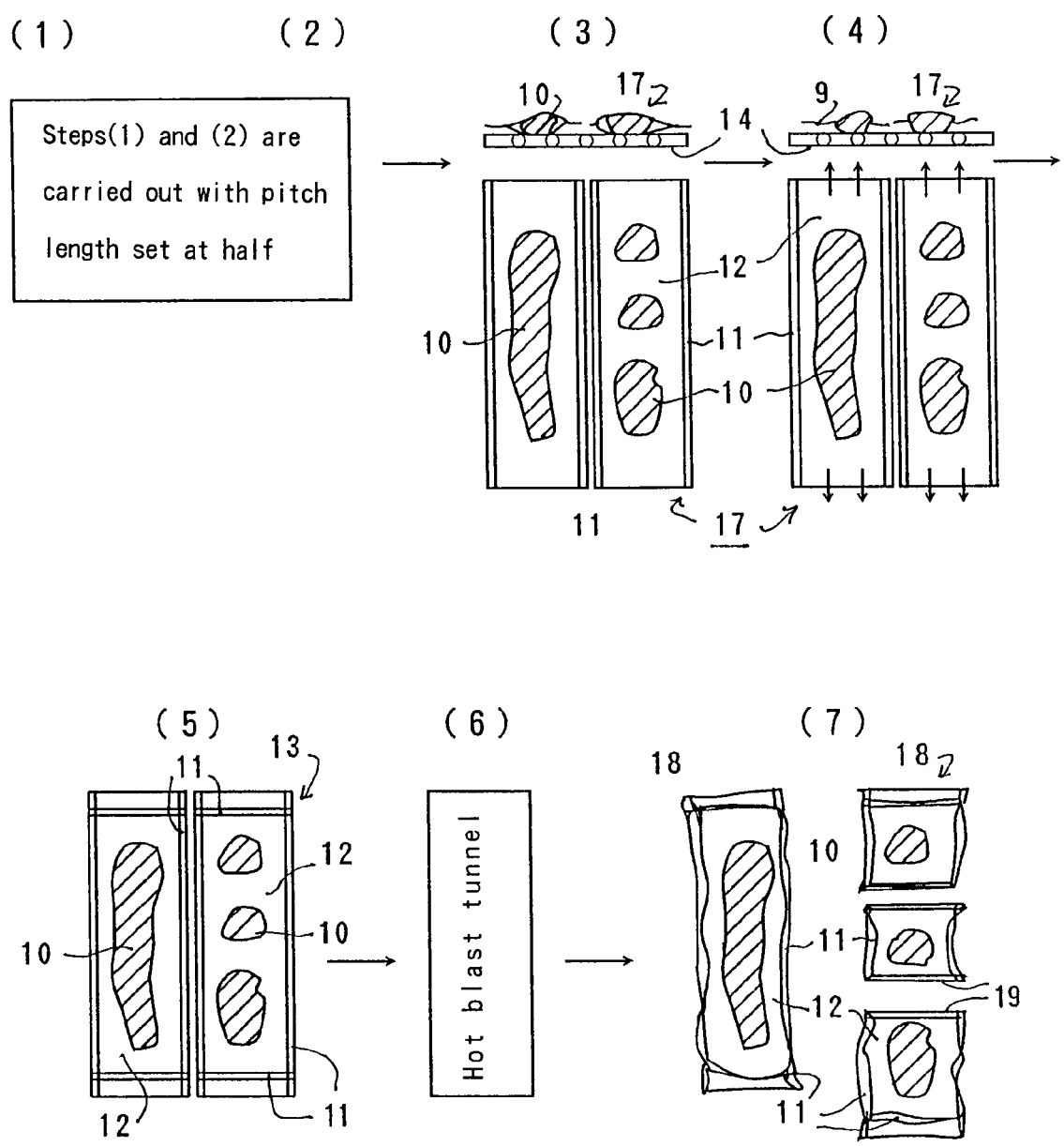
FIG. 4 is a flow sheet illustrating exemplary sequential steps which are performed in a second embodiment of the vacuum unitary packaging method of the present invention.

In a second embodiment of the vacuum unitary packaging method of the present invention, following steps (1) to (7) are sequentially performed as illustrated in FIG. 4.

At steps (1) and (2) in FIG. 4, upper and lower films wrapping a long, thin portion-cut meat, such as a fillet or the like, and small-sized portion-cut meats are fusion bonded with a pitch length being set at half a normal one to obtain two half-width tubular sealed objects 17. This state is shown in FIG. 4 (3). At step (4), the two half-width tubular sealed objects 17 are evacuated by suction at one time. Then, as described in FIG. 3, the films at openings of the tubular sealed objects are fusion bonded to each other, and, at step (6), the tubular sealed objects are passed through a hot blast tunnel. For a four-side sealed object containing only one portion-cut meat, as shown at the left in FIG. 4 (5), step (7) is not required because it provides a vacuum unitary packaged object 18 as it is. Therefore, if the two tubular sealed objects 17 which have been processed by a suction evacuation at step (4) hold only one portion-cut meat, respectively, a secondary cutting step of (7) is not needed for these two sealed objects.

For a four-side sealed object containing at least two portion-cut meats, as shown at the right in FIG. 4 (5), the films in the area between portion-cut meats 10 are fusion bonded and secondary-cut, using the impulse sealer of the present invention. From a four-side sealed object containing three portion-cut meats, as shown at the right in FIG. 4 (5), three vacuum unitary packaged objects 18 having secondary-cut portions 19 are obtained.

Of course, at least two portion-cut meats may be loaded on the rotor conveyor in place of the long, thin portion-cut meat as shown at the left in FIG. 4 (3). As in the first embodiment, for films which have a high heat shrinkage percentage, step (7) is performed prior to step (5).

In FIG. 4, steps for performing operation with the pitch length being set at half the normal one are illustrated, however, the operation may be performed with the pitch length being set at the normal one with the same meat layout scheme as shown in FIG. 4. In this case, after passing through the hot blast tunnel, secondary cutting is performed in a direction perpendicular to that of flow of products by using the impulse sealer of the present invention to obtain one vacuum unitary packaged object 18 and one vacuum four-side sealed object containing three portion-cut meats. Then, this vacuum four-side sealed object 13 is secondary-cut by the impulse sealer of the present invention to further obtain three vacuum unitary packaged objects. Also in this case, at least two portion-cut meats may be loaded on the rotor conveyor in place of a long, thin portion-cut meat as shown at the left in FIG. 4 (3), and in such a scheme, through secondary cutting in directions perpendicular to and parallel with that of flow of products, the two vacuum four-side sealed objects are divided into vacuum unitary packaged objects.

Also in the second embodiment, if a highly heat-shrinkable film is used, it is preferable that the step of secondary cutting by the impulse sealer of the present invention be followed by the step of passing through the hot blast tunnel.

EXAMPLES

Example 1

Portion-cut meats obtained by dividing one head of pig into thirty portions were packaged with upper and lower films having a width of 850 mm and gas-barrier properties. The films were approximately 25 μm thick, being produced by laminating a biaxially stretched polyamide layer having a thickness of 9 μm, an EVAL layer having a thickness of 4 μm, and a linear low density polyethylene layer having a thickness of 12 μm in this order. A heat shrinkage percentage of the films at 85 deg C. was approximately 5%. A melting peak temperature of the linear low density polyethylene layer, which is a thermal fusion bonding layer, was 78 deg C. as measured using a differential scanning calorimeter in compliance with JIS K 7121. Packaging was performed by performing following steps, as illustrated in FIG. 3.

(1) On lower film 15 which had been unrolled to a portion-cut meat loading area on rotor conveyor 14, with the thermal fusion bonding layer being faced upward, and whose front end had been fusion bonded to that of upper film 16 and cut, two relatively large portion-cut meats 10 were loaded onto the lower film in a direction perpendicular to that of flow of films, with a spacing being given therebetween.

(2) The two portion-cut meats loaded on the lower film were covered with the upper film 16.

(3) In an area behind the two portion-cut meats, the films were fusion bonded to each other in a direction perpendicular to that of the flow of the films to hold the two portion-cut meats 10 in a tubular sealed object 17.

(4) The tubular sealed object 17 was covered with a vacuum box, and evacuated from both openings, which resulted in the upper and lower films being brought into tight contact with the portion-cut meats, and a flat part 12 being formed in areas where no portion-cut meat existed, and with the upper and lower films being tightly contacted with each other. One cycle of this evacuation step took approximately 15 sec.

(5) The films at the openings of the tubular sealed object 17 were fusion bonded to each other, with a vacuum being maintained, to obtain a four-side sealed object 13.

(6) This four-side sealed object 13 was passed through the hot blast tunnel at 85 deg C. for 5 sec.

(7) In an area between the two portion-cut meats in the four-side sealed object whose flat parts had self-welded, the films were fusion bonded and secondary-cut, using the impulse sealer of the present invention as shown in FIGS. 2(A) and 2(B), to obtain two vacuum unitary packaged objects 18.

In the present EXAMPLE, the vacuum four-side sealed object was placed on lower heater units 4 of the impulse sealer, and a middle of the flat part 12 between the two portion-cut meats 10 were aligned with a middle between two lower heater wires 5, under which cutting blade 8 is waiting. Then, mounting guide 1 was lowered as shown in FIG. 2(B) to press the films. Then, first energization of the upper heater wires 3 was performed for 0.7 sec. Then, the heater units were cooled for 0.3 sec, without energizing both of the upper heater wires 3 and the lower heater wires 5, which was then followed by starting second energization of the lower heater wires 5, with the cutting blade 8 being raised at the same time. A period of time for energizing the lower heater wires 5 was 1 sec, and that required for the cutting blade 8 to be returned to a position as shown in FIG. 2(A) after cutting was also approximately 1 sec. Thereafter, energization was stopped for approximately 1.5 sec for cooling, and then by lifting the mounting guide 1, two secondary-cut vacuum unitary packaged objects 18 were obtained.

Time required for each cycle of this impulse sealer operation, which consisted of loading the four-side sealed object which had passed through the hot blast tunnel, lowering the mounting guide 1, energization of the upper heater wires 3, cooling, energization of the lower heater wires 5, cooling, and removing the vacuum unitary packaged objects 18 obtained was 5.5 sec on average, and secondary-cut portions 19 had not been stretched.

The four-side sealed objects which were passed through the hot blast tunnel used in the present EXAMPLE were not limited to hermetic bags containing two portion-cut meats 10, as shown in FIG. 3, but also included hermetic bags containing at least three portion-cut meats.

Comparative Example 1

Here is a report of a result of performing the art of the patent literature 1.

In COMPARATIVE EXAMPLE 1, a four-side sealed object which had passed through the hot blast tunnel was obtained in the same manner. The mounting guide 1 was lowered to press the films, then energization of the upper heater wires 3 was performed for 0.7 sec, which was then followed by cooling for 0.3 sec. Then, energization of the lower heater wires 5 was performed for 1 sec, which was then followed by cooling for 2 sec, and then raising the cutting blade 8 for cutting, then vacuum unitary packaged objects 18 obtained were removed. Also in this case, as in EXAMPLE 1, four-side sealed bags containing at least three; portion-cut meats were handled; however, one cycle required 7 sec on average.

The breakdown of these 7 sec was: approximately 2 sec in total for taking out the vacuum unitary packaged objects 18 and loading the four-side sealed object; approximately 0.7 sec for the energization of the upper heater wires 3; 0.3 sec for cooling; 1 sec for the energization of the lower heater wires 5; 2 sec for cooling; and approximately 1 sec for cutting.

Example 2

Figure 5:
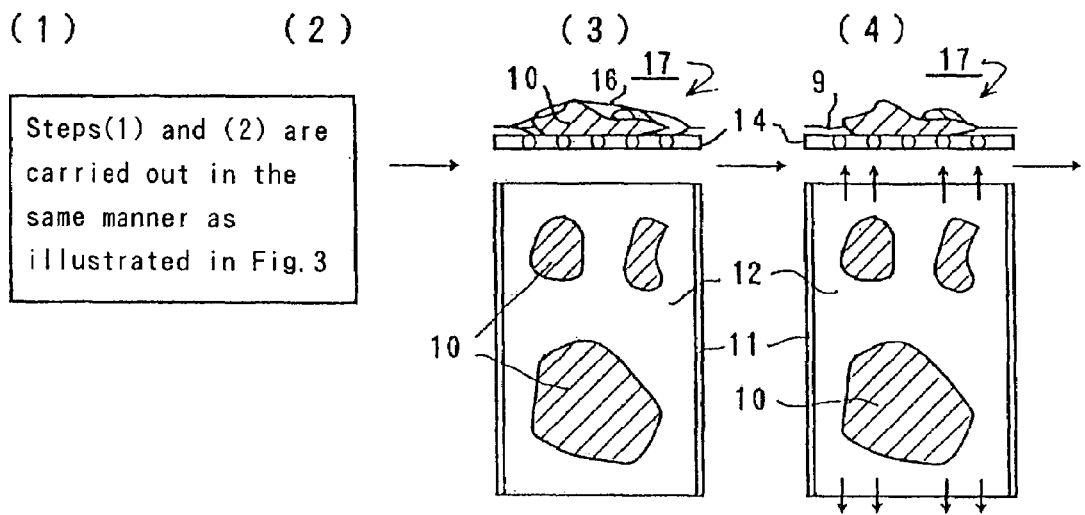
FIG. 5 is a flow sheet illustrating exemplary sequential steps which were performed in EXAMPLE 2 of the vacuum unitary packaging method of the present invention.
Figure 5:
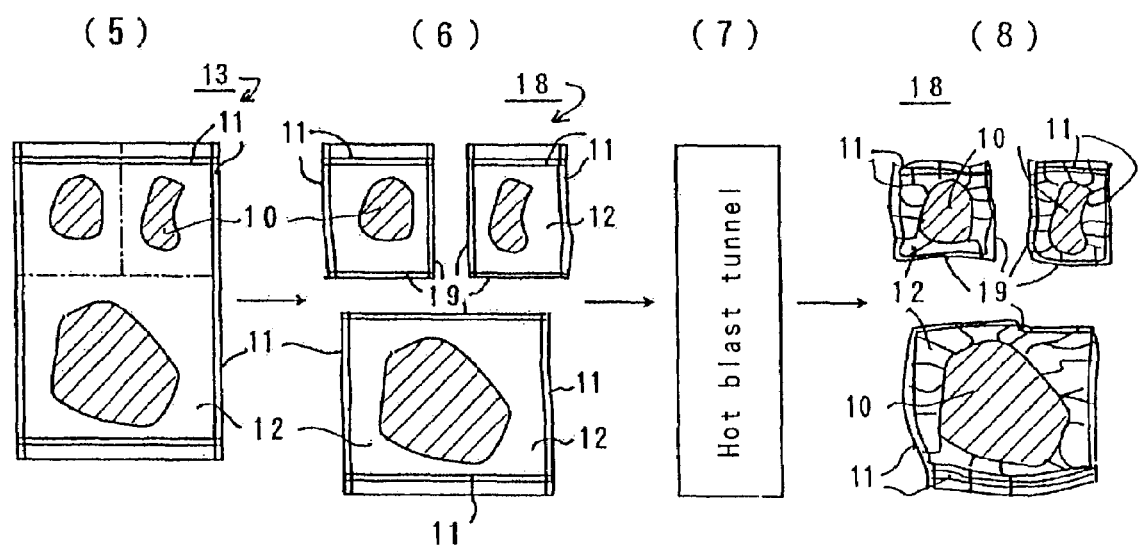

Vacuum unitary packaged objects were obtained in the same manner as in EXAMPLE 1, except that films having a heat shrinkage percentage of 40% at 85 deg C. were used, and a method as illustrated in FIG. 5 was employed.

Step (1) was performed in the same manner as in EXAMPLE 1, except that a total of three portion-cut meats, one relatively large portion-cut meat and two relatively small portion-cut meats, were loaded as shown in FIG. 5, being separated from one another, on lower film 15. Steps (2), (3), (4) and (5) were performed in the same manner as in EXAMPLE 1.

Virtual lines in the drawing for step (5) in FIG. 5 indicate locations where films are to be fusion bonded and secondary-cut by the impulse sealer of the present invention.

At step (6), the films were fusion bonded and secondary-cut at a location of a transverse virtual line in the drawing for step (5), using the impulse sealer of the present invention, to obtain one vacuum unitary packaged object 18. Then, the films were fusion bonded and secondary-cut at a location of a longitudinal virtual line in this figure, using the impulse sealer of the present invention, to obtain two vacuum unitary packaged objects, thereby obtaining a total of three vacuum unitary packaged objects 18.

(7) The vacuum unitary packaged objects 18 obtained were passed through a hot blast tunnel at 85 deg C. for 5 sec.

(8) As a result of this, three vacuum unitary packaged objects 18 each containing a portion-cut meat in which the films had been heated, and as a result, the films in flat parts 12 had self-welded and shrunk, generating wrinkles, were obtained.

In EXAMPLE 2 as illustrated in FIG. 5, the fusion bonding and secondary cutting using the impulse sealer of the present invention were performed twice; thus a time required for sealing and secondary cutting was approximately 11 sec in total.

In the present example, because heat-shrinkable films were used, passage through the hot blast tunnel was performed after the sealing and secondary cutting. By passing through the hot blast tunnel, the films in the flat parts 12 shrank to provide so-called shrink packaged objects having a large number of wrinkles.

What is claimed is:

1. A method for high-speed vacuum unitary packaging of portion-cut meats, comprising:

loading at least two portion-cut meats onto a lower film on a conveyor with a prescribed spacing existing between said at least two portion-cut meats, said lower film having a gas-barrier property and an inner surface thermal fusion bonding property;

covering said at least two portion-cut meats with an upper film having a gas-barrier property and an inner surface thermal fusion bonding property;

fusion bonding said lower film to said upper film on a first side of said at least two portion-cut meats and on a second side of said at least two portion-cut meats, thereby forming a tubular member within which are said at least two portion-cut meats;

evacuating said tubular member, thereby providing an evacuated tubular member within which are said at least two portion-cut meats; then fusion bonding said lower film to said upper film on a third side of said at least two portion-cut meats and on a fourth side of said at least two portion-cut meats, with said third and fourth sides being transverse to said first and second sides, thereby providing an evacuated package including said at least two portion-cut meats; then one of (i) using upper heater wires of a heat impulse sealer to heat said upper film from above said upper film, and then cutting said upper film and said lower film between said at least two portion-cut meats while using lower heater wires of said heat impulse sealer to heat said lower film from below said lower film, thereby fusion bonding said lower film to said upper film along at least two seal lines between said at least two portion-cut meats while cutting said upper film and said lower film between said at least two seal lines, and thereby providing individual evacuated packages each including at least one of said at least two portion-cut meats, and (ii) using lower heater wires of a heat impulse sealer to heat said lower film from below said lower film, and then cutting said upper film and said lower film between said at least two portion-cut meats while using upper heater wires of said heat impulse sealer to heat said upper film from above said upper film, thereby fusion bonding said lower film to said upper film along at least two seal lines between said at least two portion-cut meats while cutting said upper film and said lower film between said at least two seal lines, and thereby providing individual evacuated packages each including at least one of said at least two portion-cut meats.

2. The method according to claim 1, wherein loading said at least two portion-cut meats onto said lower film comprises loading said at least two portion-cut meats onto a lower film that has been unrolled, covering said at least two portion-cut meats with said upper film comprises covering said at least two portion-cut meats with an upper film that has been unrolled, said first side of said at least two portion-cut meats and said second side of said at least two portion-cut meats are spaced from one another along an unrolling direction of said upper film and an unrolling direction of said lower film, and forming a tubular member within which are said at least two portion-cut meats includes cutting said upper film and said lower film along said second side of said at least two portion-cut meats after fusion bonding said lower film to said upper film on said second side of said at least two portion-cut meats, evacuating said tubular member comprises covering said tubular member with a vacuum box and evacuating said tubular member from opposite openings of said tubular member, and fusion bonding said lower film to said upper film on said third side of said at least two portion-cut meats and on said fourth side of said at least two portion-cut meats comprises fusion bonding said upper and lower films at said opposite openings of said tubular member, said method further comprising:

passing said evacuated package through a hot blast tunnel.

3. The method according to claim 2, wherein said lower film includes a thermal fusion bonding layer having self-welding properties, and said upper film includes a thermal fusion bonding layer having self-welding properties.

4. The method according to claim 3, wherein said thermal fusion bonding layer of said lower film has a melting peak temperature within a range of from 60° C. to 110° C., and said thermal fusion bonding layer of said upper film has a melting peak temperature within a range of from 60° C. to 110° C.

5. The method according to claim 2, wherein said lower film includes a thermal fusion bonding layer having a melting peak temperature within a range of from 60° C. to 110° C., and said upper film includes a thermal fusion bonding layer having a melting peak temperature within a range of from 60° C. to 110° C.

6. The method according to claim 2, wherein if (i) is performed then using upper heater wires of a heat impulse sealer to heat said upper film from above said upper film, and then cutting said upper film and said lower film between said at least two portion-cut meats while using lower heater wires of said heat impulse sealer to heat said lower film from below said lower film, comprises using said upper heater wires for a first period of time to heat said upper film, and then cutting said upper film and said lower film between said at least two portion-cut meats while using said lower heater wires for a second period of time to heat said lower film, with said first period of time being less than said second period of time, or if (ii) is performed then using lower heater wires of a heat impulse sealer to heat said lower film from below said lower film, and then cutting said upper film and said lower film between said at least two portion-cut meats while using upper heater wires of said heat impulse sealer to heat said upper film from above said upper film, comprises using said lower heater wires for a first period of time to heat said lower film, and then cutting said upper film and said lower film between said at least two portion-cut meats while using said upper heater wires for a second period of time to heat said upper film, with said first period of time being less than said second period of time.

7. The method according to claim 2, wherein if (i) is performed then using upper heater wires of a heat impulse sealer to heat said upper film from above said upper film comprises using said upper heater wires for a period of time to heat said upper film such that said upper film and said lower film become sufficiently temporarily fusion bonded to one another to maintain vacuum properties of said evacuated package so long as a position of said at least two seal lines relative to one another is not changed, or if (ii) is performed then using lower heater wires of a heat impulse sealer to heat said lower film from below said lower film comprises using said lower heater wires for a period of time to heat said lower film such that said upper film and said lower film become sufficiently temporarily fusion bonded to one another to maintain vacuum properties of said evacuated package so long as a position of said at least two seal lines relative to one another is not changed.

8. The method according to claim 1, wherein loading said at least two portion-cut meats onto said lower film comprises loading said at least two portion-cut meats onto a lower film that has been unrolled, covering said at least two portion-cut meats with said upper film comprises covering said at least two portion-cut meats with an upper film that has been unrolled, said first side of said at least two portion-cut meats and said second side of said at least two portion-cut meats are spaced from one another along an unrolling direction of said upper film and an unrolling direction of said lower film, and forming a tubular member within which are said at least two portion-cut meats includes cutting said upper film and said lower film along said second side of said at least two portion-cut meats after fusion bonding said lower film to said upper film on said second side of said at least two portion-cut meats, evacuating said tubular member comprises covering said tubular member with a vacuum box and evacuating said tubular member from opposite openings of said tubular member, and fusion bonding said lower film to said upper film on said third side of said at least two portion-cut meats and on said fourth side of said at least two portion-cut meats comprises fusion bonding said upper and lower films at said opposite openings of said tubular member, said method further comprising:

passing said individual evacuated packages through a hot blast tunnel.

9. The method according to claim 8, wherein
said lower film includes a thermal fusion bonding layer having self-welding properties, and
said upper film includes a thermal fusion bonding layer having self-welding properties.

10. The method according to claim 9, wherein
said thermal fusion bonding layer of said lower film has a melting peak temperature within a range of from 60° C. to 110° C., and
said thermal fusion bonding layer of said upper film has a melting peak temperature within a range of from 60° C. to 110° C.

11. The method according to claim 8, wherein
said lower film includes a thermal fusion bonding layer having a melting peak temperature within a range of from 60° C. to 110° C., and
said upper film includes a thermal fusion bonding layer having a melting peak temperature within a range of from 60° C. to 110° C.

12. The method according to claim 8, wherein
if (i) is performed then using upper heater wires of a heat impulse sealer to heat said upper film from above said upper film, and then cutting said upper film and said lower film between said at least two portion-cut meats while using lower heater wires of said heat impulse sealer to heat said lower film from below said lower film, comprises using said upper heater wires for a first period of time to heat said upper film, and then cutting said upper film and said lower film between said at least two portion-cut meats while using said lower heater wires for a second period of time to heat said lower film, with said first period of time being less than said second period of time, or if (ii) is performed then using lower heater wires of a heat impulse sealer to heat said lower film from below said lower film, and then cutting said upper film and said lower film between said at least two portion-cut meats while using upper heater wires of said heat impulse sealer to heat said upper film from above said upper film, comprises using said lower heater wires for a first period of time to heat said lower film, and then cutting said upper film and said lower film between said at least two portion-cut meats while using said upper heater wires for a second period of time to heat said upper film, with said first period of time being less than said second period of time.

13. The method according to claim 8, wherein
if (i) is performed then using upper heater wires of a heat impulse sealer to heat said upper film from above said upper film comprises using said upper heater wires for a period of time to heat said upper film such that said upper film and said lower film become sufficiently temporarily fusion bonded to one another to maintain vacuum properties of said evacuated package so long as a position of said at least two seal lines relative to one another is not changed, or if (ii) is performed then using lower heater wires of a heat impulse sealer to heat said lower film from below said lower film comprises using said lower heater wires for a period of time to heat said lower film such that said upper film and said lower film become sufficiently temporarily fusion bonded to one another to maintain vacuum properties of said evacuated package so long as a position of said at least two seal lines relative to one another is not changed.

14. The method according to claim 1, wherein
said lower film includes a thermal fusion bonding layer having self-welding properties, and
said upper film includes a thermal fusion bonding layer having self-welding properties.

15. The method according to claim 14, wherein
said thermal fusion bonding layer of said lower film has a melting peak temperature within a range of from 60° C. to 110° C., and
said thermal fusion bonding layer of said upper film has a melting peak temperature within a range of from 60° C. to 110° C.

16. The method according to claim 1, wherein
said lower film includes a thermal fusion bonding layer having a melting peak temperature within a range of from 60° C. to 110° C., and
said upper film includes a thermal fusion bonding layer having a melting peak temperature within a range of from 60° C. to 110° C.

17. The method according to claim 1, wherein
if (i) is performed then using upper heater wires of a heat impulse sealer to heat said upper film from above said upper film, and then cutting said upper film and said lower film between said at least two portion-cut meats while using lower heater wires of said heat impulse sealer to heat said lower film from below said lower film, comprises using said upper heater wires for a first period of time to heat said upper film, and then cutting said upper film and said lower film between said at least two portion-cut meats while using said lower heater wires for a second period of time to heat said lower film, with said first period of time being less than said second period of time, or if (ii) is performed then using lower heater wires of a heat impulse sealer to heat said lower film from below said lower film, and then cutting said upper film and said lower film between said at least two portion-cut meats while using upper heater wires of said heat impulse sealer to heat said upper film from above said upper film, comprises using said lower heater wires for a first period of time to heat said lower film, and then cutting said upper film and said lower film between said at least two portion-cut meats while using said upper heater wires for a second period of time to heat said upper film, with said first period of time being less than said second period of time.

18. The method according to claim 1, wherein
if (i) is performed then using upper heater wires of a heat impulse sealer to heat said upper film from above said upper film comprises using said upper heater wires for a period of time to heat said upper film such that said upper film and said lower film become sufficiently temporarily fusion bonded to one another to maintain vacuum properties of said evacuated package so long as a position of said at least two seal lines relative to one another is not changed, or if (ii) is performed then using lower heater wires of a heat impulse sealer to heat said lower film from below said lower film comprises using said lower heater wires for a period of time to heat said lower film such that said upper film and said lower film become sufficiently temporarily fusion bonded to one another to maintain vacuum properties of said evacuated package so long as a position of said at least two seal lines relative to one another is not changed.

19. The method according to claim 1, further comprising:
passing said evacuated package through a hot blast tunnel.

20. The method according to claim 1, further comprising:
passing said individual evacuated packages through a hot blast tunnel.

* * * * *